(12) United States Patent
Ganesan et al.

(10) Patent No.: US 6,589,575 B2
(45) Date of Patent: Jul. 8, 2003

(54) COLD WATER SOLUBLE TEA

(75) Inventors: Velu Ganesan, District Tinsukia (IN); Shovan Ganguli, Bangalore (IN); Kush Garg, District Tinsukia (IN); Mushtaq Patel, Karlsruhe (DE); Vilas Pandurang Sinkar, Bangalore (IN); Narayasaswami Subramanian, Bangalore (IN)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 25 days.

(21) Appl. No.: 09/815,401

(22) Filed: Mar. 22, 2001

(65) Prior Publication Data

US 2001/0033880 A1 Oct. 25, 2001

(30) Foreign Application Priority Data

Mar. 22, 2000 (IN) .................................. 249/MUM/2000
Apr. 27, 2000 (GB) .............................................. 0010311

(51) Int. Cl.$^7$ ............................... A23F 3/00; A23F 3/08
(52) U.S. Cl. .......................... 426/52; 426/597; 426/442
(58) Field of Search .......................... 426/597, 52, 442

(56) References Cited

U.S. PATENT DOCUMENTS

| 3,812,266 A | 5/1974 | Sanderson et al. |
| 4,051,264 A | 9/1977 | Sanderson et al. |
| 5,780,086 A | * 7/1998 | Kirksey et al. |

FOREIGN PATENT DOCUMENTS

| DE | 902 702 A | 2/1982 |
| EP | 0 760 213 A | 3/1997 |
| GB | 1 546 508 | 5/1979 |
| JP | 020009341 | 1/1990 |
| JP | 030080045 | 4/1991 |
| JP | 04 121146 A | 4/1992 |
| JP | 040148646 | 5/1992 |
| SU | 1517903 | 10/1989 |
| WO | 97/18720 | 5/1997 |

OTHER PUBLICATIONS

International Search Report dated Aug. 6, 2001.
Red Pigment Produced by the Reaction of Dehydro–L–ascorbic Acid with α–Amino Acid, Agr. Biol. Chem, 37 (6), pp. 1471–1477 (1973).
Translation of SU 1517903 A!

* cited by examiner

Primary Examiner—Anthony J. Weier

(57) ABSTRACT

A process for manufacturing a black leaf tea that is infusible in hot or cold water. The process involves macerating freshly plucked tea leaves, allowing them to ferment, firing the leaves to arrest fermentation and then drying them to yield black leaf tea, wherein the tea leaves are treated with a solubilising compound selected ascorbic acid, dehydroascorbic acid, 1-scorbamic acid, 5-phenyl-3,4-diketo-gamma-butyrolactone (4-phenyl-2,3-diketo-gamma-butyrolactone) or their salts and mixtures thereof in an amount that is sufficient for the black leaf tea to be soluble in water at 5 to 100° C.

8 Claims, No Drawings

COLD WATER SOLUBLE TEA

FIELD OF THE INVENTION

This invention relates to a process for obtaining cold water infusible or extractable tea and to the products obtained thereby that have good colour and flavour.

BACKGROUND AND PRIOR ART

Leaf tea may be prepared as green leaf tea or black leaf tea. Generally, to prepare black leaf tea fresh green leaves of the plant *Camellia sinensis* are withered (subjected to mild drying), comminuted, fermented (in which process enzymes in the tea leaf use atmospheric oxygen to oxidise various substrates to produce brown-coloured products) and then fired (to dry the tea leaves). Green leaf tea is not exposed to the fermentation process. Partial fermentation may be used to produce intermediate-type teas known as "oolong" tea.

Tea is consumed as a hot beverage or a cold beverage such as iced tea. The numerous compounds in the leaves that give the beverage its unique organoleptical properties are only sparingly soluble in cold water so tea is usually infused in water at temperatures close to 100° C. When iced tea is desired the tea is infused in water at about 100° C. and then chilled in a refrigerator for example until it is cold. Unfortunately this can take several hours.

Once can prepare iced tea by dissolving the spray dried liquor obtained at high temperature from black tea or fibres generated during black tea manufacturing process in cold water.

U.S. Pat. No. 4,051,264 (Lipton/Sanderson) discloses a method for making a cold water soluble leaf tea extract. Tea leaves are pre-treated with tannase under anaerobic conditions to generate a cold-water infusing tea with good colour, yield and flavour.

U.S. Pat. No. 3,812,266 (Sanderson/Coggon) discloses a method that involves converting green tea to black using tannase and natural tea enzymes. The method also includes a tannase pre-treatment step, but in a slurry system, followed by oxidation by natural tea enzymes to convert green tea into black, and generate tea powders, which are both hot and cold water soluble.

The article by Tadao Kurata et al in Agr. Biol. Chem, 37 (6), 1471–1477, 1973 discloses that a red pigment is produced at the initial stage of the browning reaction of dehydro-L-ascorbic acid (DHA) with alpha-amino acid. 5-phenyl-3,4-diketo-gamma-butyrolactone, which has the same type of lactone ring structure as dehydro-L-ascorbic acid, is said to give a similar red colour when reacted with alpha-amino acid. The pigment is said to have the same structure as the red pigment that is produced by the oxidation of L-scorbamic acid.

Tannase is an expensive enzyme and is also not legally cleared in several countries for usage in tea. In any event, while this is convenient, for many consumers the quality of the final beverage is not equal to that prepared from hot infused leaves. Some consumers prefer not to use powders as they perceive them to be artificial, unnatural and simply lacking in the romance of taking tea.

There is therefore a need for a leaf tea that yields acceptable tea flavour and colour when infused in cold water.

The present inventors have now found that one can prepare a black leaf tea that provides a high quality tea beverage when infused in hot or cold water by treating tea leaves with one or more of ascorbic acid, dehydroascorbic acid, 1-scorbamic acid or 5-phenyl-3,4-diketo-gamma-butyrolactone (4-phenyl-2,3-diketo-gamma-butyrolactone) or their salts during black tea manufacture.

STATEMENT OF THE INVENTION

The present invention can be said in broad terms to relate to a process for manufacturing a cold water soluble black leaf tea comprising the steps of macerating freshly plucked tea leaves, allowing them to ferment, firing the leaves to arrest fermentation and then drying them to yield black leaf tea, the process being characterised in that the tea leaves are treated with a solubilising compound selected from the group consisting of ascorbic acid, dehydroascorbic acid, 1-scorbamic acid, 5-phenyl-3,4-diketo-gamma-butyrolactone or their salts and mixtures thereof in an amount that is sufficient for the black leaf tea to be soluble in water at 5 to 100° C.

The tea leaves are preferably treated with the solubilising compound in the presence of oxidative enzymes and/or hydrogen peroxide to enhance the tea flavour and colour.

"Tea" for the purposes of the present invention means leaf material from *Camellia sinensis* var. *sinensis* or *Camellia sinensis* var. *assamica*. It also includes rooibos tea obtained from *Aspalathus linearis* however that is a poor source of endogenous fermenting enzymes. "Tea" is also intended to include the product of blending two or more of any of these teas.

"Leaf tea" for the purposes of this invention means a tea product that contains one or more tea origins in an uninfused form.

"Cold water soluble" for the purposes of this invention means giving good colour, flavour and mouthfeel in a short infusion time i.e. less than 10 minutes, but preferably less than 5 minutes at a temperature at or above 5° C.

For the avoidance of doubt the word "comprising" is intended to mean including but not necessarily "consisting of" or "composed of". In other words the listed steps or options need not be exhaustive.

DETAILED DESCRIPTION OF THE INVENTION

Tea manufacture, especially black tea manufacture, traditionally comprises: withering, macerating, fermenting and firing. Black tea for the purpose of the invention is obtained by the following process.

Withering is a process whereby the plucked tea leaves are stored for periods of time (perhaps up to 24 hours), during which they undergo various biochemical and physical changes which often includes a loss of moisture. It is optional but preferred.

Maceration follows the withering step, and traditionally the withered leaves are optionally rolled to bruise and crush the leaves i.e. break down the plant tissue structure. This will have the effect of liberating fermentable substrates and fermenting enzymes from within the plant cells and tissue. Modern tea manufacture usually includes this step however the plant cells and tissue is broken down by passing tea, which has usually been withered, through a cutting machine. Thus for the purpose of the invention the green tea leaves may be macerated using a CTC, ball mill or a grinder or a hammer mill or a LAWRI™ tea processor or a LEGG™ cutting machine or rolled using tea rollers as in orthodox tea processing.

The next step is commonly called fermentation but that is a misnomer. "Fermentation" is commonly used in the context of brewing alcohol to describe the action of exogenous enzymes. However in the tea world it is used to refer to the oxidative and hydrolytic process that tea undergoes when certain endogenous enzymes and substrates are brought together by mechanical disruption of the cells by macerating of the leaves. During this process colourless catechins in the leaves are converted to a complex mixture of yellow and orange to dark-brown substances and producing a large number of aromatic volatile compounds.

The fermented product is fired and dried to give a black leaf tea. The firing involves heating and drying the tea to destroy the fermenting enzymes and thereby arrest fermentation. It results in a reduction of moisture content to below 5%, and also leads to further chemical oxidation and changes in tea aroma. This generally involves exposing the tea to a blast of hot, dry air in a dryer.

The present invention concerns a modification to traditional black tea manufacture. The modification involves treating the tea leaves with a solubilising compound selected from the group consisting of ascorbic acid, dehydroascorbic acid, 1-scorbamic acid, 5-phenyl-3,4-diketo-gamma-butyrolactone or their salts and mixtures thereof in order to enhance the solubility of the black tea in cold water.

The solubilising compound 5-phenyl-3,4-diketo-gamma-butyrolactone referred to in the aforementioned article in Agr. Biol. Chem, 37 (6), 1471–1477, 1973 by Tadao Kurata et al has oxygen at the 1 position as is common when labelling heterocyclic compounds. However this compound can also be labelled as 4-phenyl-2,3-diketo-gamma-butyrolactone, wherein the keto groups are at the 2 and 3 positions and the phenyl group is at the 4 position.

The tea leaves are treated with the solubilising compound post plucking, preferably prior to an optional but preferable withering step. The withering step, if desired, preferably tales 1 to 24 hours at 10 to 40° C.

The compounds are preferably in the form of a solution at a concentration of from 0.5 to 10% by weight of tea. The solubilising compound can be applied singly or in split doses. The treatment is preferably given in the form of a spray or dip.

The tea is preferably fermented for 10 minutes to 3 hours at 10 to 60° C.

It is particularly preferred to provide additional oxidative enzymes and hydrogen peroxide along with the above treatment to enhance the generation of colour and flavour.

The oxidative enzymes may be selected from polyphenol oxidase, tyrosinase and peroxidase of bacterial, fungal or plant origin at concentrations ranging from 2000 to 100000 units per gram on the basis of made black tea and hydrogen peroxide at concentrations ranging from 0.01 to 1% on the basis of made black tea The tea can be dried using any art-known means, preferably giving leaf tea with a moisture content of less than 5%.

The products obtained by the above process can be used to produce instant tea or for infusing black tea in water at temperatures in the range of 5 to 100° C. The instant tea can be produced by extracting the tea leaves produced by the above process with boiling water, clarifying the extract, and drying it. The instant tea produced by this method will give higher yields of cold water soluble tea solids having superior tea colour and flavour than the instant tea produced by the conventional methods. Water infusions of the tea produced by the process described above in water at temperatures in the range of 5 to 100° C. will give tea with superior colour and flavour.

A first preferred embodiment of the process of the invention comprises the steps of:
  (a) macerating green tea leaves optionally after withering for 1–24 hours;
  (b) processing the macerated tea in a conventional manner to obtain black tea, wherein the green tea is treated with at least one of ascorbic acid, dehydroascorbic acid, 1-scorbamic acid, 5-phenyl-3,4-diketo-gamma-butyrolactone (4-phenyl-2,3-diketo-gamma-butyrolactone) or their salts in single or split doses at a concentrate of 0.5 to 10% by wt. of tea selectively prior to maceration and/or during maceration and/or the post maceration stages of the above processing of tea depending upon the quality of the infusibility desired;
  (c) fermenting the macerated tea optionally up to 3 hours at temperature of 10 to 60° C.; and
  (d) processing the tea in a conventional manner to obtain black tea.

A second preferred embodiment of the process of the invention comprises the steps of:
  (a) macerating the green tea leaves that has been optionally withered for 1–24 hours;
  (b) treating the macerated green tea with one or more of ascorbic acid, dehydroascorbic acid, 1-scorbamic acid or 5-phenyl-3,4-diketo-gamma-butyrolactone (4-phenyl-2,3-diketo-gamma-butyrolactone) or their salts in single or in split doses, at a concentration 0.5 to 10% by weight of made tea;
  (c) fermenting the macerated, treated tea for 10 minutes to 3 hours at a temperature of 10 to 50° C.; and
  (d) processing the material in a conventional manner to obtain black tea.

A third preferred embodiment of the process of the invention comprises the steps of:
  (a) macerating the green tea leaves that has been optionally withered for 1 to 24 hours at 10 to 40° C.;
  (b) treating the macerated mass with one or more of ascorbic acid, dehydroascorbic acid, 1-scorbamic acid or 5-phenyl-3,4-diketo-gamma-bytyrolactone (4-phenyl-2,3-diketo-gamma-butyrolactone) or their slats in single or in split doses, at a concentration 0.5 to 10% by weight of made tea;
  (c) fermenting the macerated, treated tea for 10 minutes to 3 hours at a temperature of 10 to 50° C.; and
  (d) drying the material at 90 to 180° C. to obtain black tea with a moisture content less than 5%.

A fourth preferred embodiment of the process of the invention comprises the steps of:
  (a) macerating the green tea leaves that has been optionally withered for 1 to 24 hours at 10 to 40° C.;
  (b) treating the macerated mass with one or more of ascorbic acid, dehydroascorbic acid, 1-scorbamic acid or 5-phenyl-3,4-diketo-gamma-butyrolactone (4-phenyl-2,3-diketo-gamma-butyrolactone) or their slats in single or in split doses, at a concentration 0.5 to 10% by weight of made tea in the presence of additional oxidative enzymes and hydrogen peroxide;
  (c) fermenting the macerated, treated tea for 10 minutes to 3 hours at a temperature of 10 to 50° C.; and
  (d) drying the material at 90 to 180° C. to obtain black tea with a moisture content less than 5%.

The process of the invention shall now be described with reference to the following example:

EXAMPLE

Manufacture of Cold Water Soluble Black Leaf Tea

Freshly harvested green leaves (1 kg) were withered for 18 hours under ambient conditions and macerated using four cuts on a CTC. Untreated macerated mass (SAMPLE 1) was processed further by fermenting on a continuous fermenting unit for 60 minutes followed by drying on a FBD drier at 135° C. to bring down the moisture to less than 5% on black tea basis. Treatment was carried out after first CTC cut (Sample 2) by adding ascorbic acid at 5% level on the basis of made black tea. The sample was processed further by fermenting at 25° C. for 60 minutes followed by drying in a fluidised bed drier at 135° C. for 20 minutes to bring down the moisture to less than 5% on black tea basis. For (Sample 3) similar treatment was carried out by processing of green leaf as for Sample 1, but adding the ascorbic acid solution after 30 minutes of fermentation and allowed to ferment for another 30 minutes and subsequently dried as mentioned in Sample 1 and 2 to give black tea. In another Sample 4, the ascorbic acid was added at the end of the fermentation and the sample was dried as described earlier.

Process for Preparing Cold Water Infusions 1.4 g of black tea samples 1 to 4 were infused in 200 ml of water at 15° C. for 5 minutes. The solution was filtered to give cold tea infusions. The colour of infusions obtained from Samples 1 to 4 was measured using a Hunter Lab Ultrascan XE™ calorimeter. The data is presented in Table 1.

Process for Preparing Hot Water Infusions

Only samples 1 and 2 obtained by the process described above were taken for testing the effect on hot water infusions. Five grams of tea, 10 grams of sugar, 150 ml of water and 100 ml of milk were mixed together and heated to boil. The tea liquor was strained to remove spent tea and colour of the liquor was measured in reflectance mode at 40° C. in a Hunter Lab Ultrascan XE™ calorimeter. The data is presented in Table 2.

Colour Measurements $L^*a^*b^*$ measurements for colour were carried out on Hunterlab UltraScan XE™ colorimeter under the following conditions: Cuvette 2 cms (Quartz), Mode Transmittance, Illuminant D65, Observer 10, Scale CIELAB Procedure: 50 ml of the brew was taken in a 2 cm quartz cuvette, reflectance was measured under the conditions mentioned above.

TABLE 1

Effect of the treatment on cold water infusions

| Sample | L* | A* | B* |
| --- | --- | --- | --- |
| Sample 1 | 76.91 | 10.09 | 51.45 |
| Sample 2 | 65.38 | 35.76 | 50.14 |
| Sample 3 | 61.61 | 42.69 | 53.27 |
| Sample 4 | 62.18 | 41.48 | 50.95 |

The data in Table 1 show that in samples 2 to 4 the a* values have been significantly increased indicating that the infusions will have a deep red colour as compared to the control (sample 1) which will a very pale yellow colour. Difference of greater than 1 in 'a' value even at a constant value of 'L' can be easily perceived by human eye and sensory panels. Higher L* value indicates greater depth of colour. Thus the data clearly shows that treatment of macerated mass at the beginning, during or after the maceration gives a higher red colour to both cold and hot water infusions.

TABLE 2

Effect of the treatment on hot water infusions

| Sample | L* | a* | b* |
| --- | --- | --- | --- |
| Sample 1 | 52.49 | 10.82 | 24.09 |
| Sample 2 | 54.01 | 15.79 | 24.39 |

Table 2 further demonstrates the suitability of hot water infusion of the treated tea (sample 2) produced in accordance with the process of the invention.

It is thus possible by way of the present invention to produce a black leaf tea that infuses well in hot or cold water.

We claim:

1. A process for manufacturing a cold water soluble black leaf tea comprising macerating freshly plucked tea leaves, allowing them to ferment, firing the leaves to arrest fermentation and then drying them to yield black leaf tea, the process being characterised in that the tea leaves are treated with a solubilising compound selected from the group consisting of ascorbic acid, dehydroascorbic acid, I-scorbamic acid, 5-phenyl-3,4-diketo-gamma-butyrolactone or their salts and mixtures thereof in an amount that is sufficient for the black leaf tea to be soluble in water at 5 to 100° C. wherein the concentration of the solubilising compound is from 0.5 to 10% by weight of tea.

2. The process according to claim 1 wherein the tea leaves are treated with the solubilising compound in an amount that is sufficient for the black leaf tea to be soluble in water at 15° C.

3. The process according to claim 1 wherein the leaves are withered prior to being macerated.

4. The process according to claim 1 wherein the leaves are treated with the solubilising compound prior to being macerated.

5. The process according to claim 1 wherein the leaves are treated with the solubilising compound while the leaves are being macerated.

6. The process according to claim 1 wherein the leaves are processed in the presence of an exogenous oxidative enzyme to enhance the generation of colour and flavour.

7. The process according to claim 6 wherein the oxidative enzyme is selected from the group consisting of polyphenol oxidase, tyrosinase and peroxidase.

8. The process according to claim 1 wherein hydrogen peroxide is added to enhance the generation of colour and flavour.

* * * * *